United States Patent
Wang et al.

(10) Patent No.: US 10,350,694 B2
(45) Date of Patent: Jul. 16, 2019

(54) NIGHTSIDE INCLINED-VERTICAL-BUTTING WELDING METHOD

(71) Applicant: China Construction Steel Structure Corp. Ltd., Shenzhen (CN)

(72) Inventors: Hong Wang, Shenzhen (CN); Huangbing Lv, Shenzhen (CN); Pai Peng, Shenzhen (CN); Yi Li, Shenzhen (CN); Chengwei Wei, Shenzhen (CN); Jianchuan Huang, Shenzhen (CN); Qiushi Xia, Shenzhen (CN)

(73) Assignee: China Construction Steel Structure Corp. Ltd., Shenzhen (CN)

( * ) Notice: Subject to any disclaimer, the term of this patent is extended or adjusted under 35 U.S.C. 154(b) by 0 days.

(21) Appl. No.: 15/924,278

(22) Filed: Mar. 19, 2018

(65) Prior Publication Data
US 2018/0207738 A1    Jul. 26, 2018

Related U.S. Application Data

(63) Continuation of application No. PCT/CN2016/090463, filed on Jul. 19, 2016.

(30) Foreign Application Priority Data

Sep. 17, 2015 (CN) .......................... 2015 1 0598282

(51) Int. Cl.
| | |
|---|---|
| *B23K 9/02* | (2006.01) |
| *B23K 33/00* | (2006.01) |
| *B23K 9/095* | (2006.01) |
| *B23K 9/32* | (2006.01) |
| *B23K 9/00* | (2006.01) |

(52) U.S. Cl.
CPC .......... *B23K 9/0206* (2013.01); *B23K 9/0026* (2013.01); *B23K 9/02* (2013.01);
(Continued)

(58) Field of Classification Search
CPC ........ B23K 9/0206; B23K 9/095; B23K 9/32; B23K 33/004
(Continued)

(56) References Cited

U.S. PATENT DOCUMENTS

| | | | | |
|---|---|---|---|---|
| 1,986,303 | A * | 1/1935 | Swift | ........................ B23K 9/23 |
| | | | | 219/137 R |
| 1,990,168 | A * | 2/1935 | Corson | ..................... C22C 9/00 |
| | | | | 148/414 |

(Continued)

FOREIGN PATENT DOCUMENTS

| | | |
|---|---|---|
| CN | 1103341 A | 6/1995 |
| CN | 1171316 A | 1/1998 |

(Continued)

*Primary Examiner* — Eric S Stapleton

(57) ABSTRACT

A method comprises: providing a weldment and a welded plate to which the weldment is to be welded, an end of the weldment to be welded to the welded plate being provided with a first welding face and a second welding face, the first welding face and the second welding face forming a pointed cone, the first welding face corresponding to a first welding area, and the second welding face corresponding to a second welding area; in the first welding area, welding being performed at the innermost side of the pointed cone to form a first welding pass; in the second welding area, welding being performed at the innermost side of the pointed cone to form a second welding pass, and then welding being performed at the outer side of the second welding pass to form a third welding pass adjacent to the second welding pass.

13 Claims, 7 Drawing Sheets

(52) U.S. Cl.
CPC ............ *B23K 9/0209* (2013.01); *B23K 9/095* (2013.01); *B23K 9/32* (2013.01); *B23K 33/004* (2013.01)

(58) Field of Classification Search
USPC ....................................................... 219/126
See application file for complete search history.

(56) References Cited

U.S. PATENT DOCUMENTS

| | | | | |
|---|---|---|---|---|
| 2,027,750 A * | 1/1936 | Munson | C22C 9/06 | 148/435 |
| 2,275,188 A * | 3/1942 | Harrington | C22F 1/08 | 148/412 |
| 2,325,041 A * | 7/1943 | Cooper | C23C 10/36 | 148/536 |
| 2,522,146 A * | 9/1950 | Tichenor | B23K 9/028 | 219/125.11 |
| 3,031,568 A * | 4/1962 | Turner | B23K 9/23 | 219/137 R |
| 3,418,707 A * | 12/1968 | Emerson | F02K 9/974 | 228/171 |
| 3,531,619 A * | 9/1970 | Broodman | B23K 9/092 | 219/130.5 |
| 3,537,646 A * | 11/1970 | Emerson | F02K 9/974 | 239/265.11 |
| 3,597,821 A * | 8/1971 | Emerson | B23C 1/00 | 239/265.15 |
| 3,732,393 A * | 5/1973 | Wilkens | B23K 9/173 | 219/137 R |
| 3,832,522 A * | 8/1974 | Arikawa | B23K 9/09 | 219/125.12 |
| 4,015,099 A * | 3/1977 | Seniuk | C25C 7/02 | 219/118 |
| 4,038,514 A * | 7/1977 | Ashton | B23K 9/0209 | 219/126 |
| 4,091,258 A * | 5/1978 | Kano | B23K 9/30 | 219/125.12 |
| 4,119,830 A * | 10/1978 | Gilliland | B23K 9/1087 | 219/132 |
| 4,146,773 A * | 3/1979 | Willems | H05H 1/32 | 219/121.45 |
| 4,147,917 A * | 4/1979 | Jelmorini | H05H 1/42 | 219/121.46 |
| 4,179,314 A * | 12/1979 | Wikle | C22F 1/08 | 148/411 |
| 4,213,026 A * | 7/1980 | Duvall | B23K 35/304 | 219/137 R |
| 4,258,242 A * | 3/1981 | Fujimori | B23K 9/188 | 219/137 R |
| 4,292,496 A * | 9/1981 | Hoy | B23K 33/004 | 219/126 |
| 4,336,441 A * | 6/1982 | Godai | B23K 9/23 | 219/123 |
| 4,355,224 A * | 10/1982 | Mesick | B23K 35/304 | 219/137 WM |
| 4,447,703 A * | 5/1984 | Stol | B23K 9/1093 | 219/130.01 |
| 4,460,659 A * | 7/1984 | Pedersen | B23K 35/302 | 148/24 |
| 4,481,402 A * | 11/1984 | Hoy | B23K 33/00 | 219/126 |
| 4,539,465 A * | 9/1985 | Bosna | B23K 9/1333 | 219/136 |
| 4,594,116 A * | 6/1986 | Inagaki | C22F 1/08 | 148/536 |
| 4,724,013 A * | 2/1988 | Church | C22F 1/08 | 148/411 |
| 4,724,302 A * | 2/1988 | Penney | B23K 9/0956 | 156/350 |
| 4,738,388 A * | 4/1988 | Bienek | G21F 5/12 | 228/135 |
| 4,782,206 A * | 11/1988 | Ayres | B23K 9/048 | 219/137 R |
| 5,080,256 A * | 1/1992 | Rockola | G07F 11/34 | 193/2 A |
| 5,217,158 A * | 6/1993 | Spiegelberg | B23K 31/02 | 148/516 |
| 5,233,149 A * | 8/1993 | Killian | B23K 33/00 | 219/137 R |
| 5,324,914 A * | 6/1994 | Murray, Jr. | B23K 9/23 | 219/137 WM |
| 5,347,098 A * | 9/1994 | Murakami | B23K 9/173 | 219/125.12 |
| 5,593,605 A * | 1/1997 | Jones | B23K 26/106 | 219/121.63 |
| 5,789,720 A * | 8/1998 | LaGall | B23K 26/28 | 219/121.64 |
| 5,796,069 A * | 8/1998 | Jones | B23K 9/0282 | 219/121.64 |
| 5,995,573 A * | 11/1999 | Murray, Jr. | G21F 5/005 | 250/507.1 |
| 6,193,145 B1 * | 2/2001 | Fournier | B23K 9/0213 | 219/137 R |
| 6,336,583 B1 * | 1/2002 | Wang | B23K 31/02 | 228/175 |
| 6,338,765 B1 * | 1/2002 | Statnikov | B23K 9/32 | 116/137 A |
| 6,499,207 B1 * | 12/2002 | Pigott | B23K 9/0026 | 198/577 |
| 6,683,268 B2 * | 1/2004 | Briand | B23K 9/0253 | 219/61 |
| 6,843,957 B2 * | 1/2005 | Statnikov | B23K 9/32 | 266/80 |
| 7,344,609 B2 * | 3/2008 | Statnikov | B23K 9/32 | 148/525 |
| 7,381,923 B2 * | 6/2008 | Gordon | B23K 9/123 | 219/137.61 |
| 7,754,033 B2 * | 7/2010 | Ishikawa | B23K 20/10 | 148/558 |
| 7,897,267 B2 * | 3/2011 | Hoyt | B23K 9/0286 | 138/142 |
| 8,110,772 B1 * | 2/2012 | Bong | B23K 25/00 | 219/73.1 |
| 8,281,472 B2 * | 10/2012 | Labonte | B21C 37/045 | 219/137 R |
| 8,378,260 B2 * | 2/2013 | Knipper | B23K 9/1735 | 219/124.4 |
| 8,839,499 B2 * | 9/2014 | LaBonte | B21C 37/045 | 219/137 R |
| 8,946,582 B1 * | 2/2015 | Bong | B23K 9/18 | 219/73.1 |
| 8,950,648 B2 * | 2/2015 | Simmons | B23K 37/0533 | 228/44.3 |
| 9,321,119 B2 * | 4/2016 | Hayakawa | B23K 9/025 | |
| 9,415,458 B2 * | 8/2016 | Doyle | B23K 9/0282 | |
| 9,605,328 B2 * | 3/2017 | Sharman | C21D 7/06 | |
| 9,623,509 B2 * | 4/2017 | Lalam | B23K 9/23 | |
| 9,815,151 B2 * | 11/2017 | Simmons | B23K 37/0533 | |
| 9,836,987 B2 * | 12/2017 | Postlethwaite | G09B 5/06 | |
| 9,895,760 B2 * | 2/2018 | Peters | B23K 9/092 | |
| 2001/0045420 A1 * | 11/2001 | Bong | B23K 9/0203 | 219/125.1 |
| 2002/0005397 A1 * | 1/2002 | Bong | B23K 9/0203 | 219/125.1 |
| 2002/0043313 A1 * | 4/2002 | Statnikov | B23K 9/32 | 148/558 |
| 2002/0079301 A1 * | 6/2002 | Bong | B23K 9/188 | 219/130.5 |

FOREIGN PATENT DOCUMENTS

| | | |
|---|---|---|
| CN | 101644190 A | 2/2010 |
| CN | 102303194 A | 1/2012 |
| CN | 105195860 A | 12/2015 |
| JP | 5153368 B2 | 2/2013 |

* cited by examiner positing the relative locations of the weldment and the welded plate

↓ the first step of welding
welding the weldment and the welded plate in the first welding area, wherein the welding position is the innermost side of the taper, thereby forming the first welding pass

↓ the second step of welding
welding the weldment and the welded plate in the second welding area, wherein the welding position is the innermost side of the taper, thereby forming the second welding pass, followed by the welding position being the outside of and next to the position of the second welding pass, thereby forming the third welding pass

↓ the third step of welding
welding the weldment and the welded plate in the first welding area, wherein the welding position is the outside of the position of the first welding pass, thereby forming the fourth welding pass, followed by the welding position being next to the outside of the position of the fourth welding pass, thereby forming the fifth welding pass

↓ the fourth step of welding
welding the weldment and the welded plate in the second welding area, wherein the welding position is the outside of the position of the third welding pass, thereby forming the sixth welding pass

Fig. 2

| Plate thickness | Welding pass | Diameter of welding wire | Current | Voltage | Speed |
|---|---|---|---|---|---|
| 30mm | 1 or 2 | Ø1.2mm | 120A | 18.5V | 13 cm\min |
| | 3 or 4 | Ø1.2mm | 135A | 20V | 9 cm\min |
| | 5 or 6 | Ø1.2mm | 125A | 20.5V | 6.5 cm\min |

Fig. 8

NIGHTSIDE INCLINED-VERTICAL-BUTTING WELDING METHOD

CROSS REFERENCE TO RELATED APPLICATIONS

This application is a continuation of PCT No. PCT/CN2016/090463 filed 2016 Jul. 19, which claims priority to CN 201510598282.4 filed 2015 Sep. 17, both of which are incorporated herein by reference.

FIELD OF THE INVENTION

The invention relates to the field of steel structure welding, and in particular to an ultra-long nightside inclined-vertical-butting welding structure and a welding method of the structure.

BACKGROUND OF THE INVENTION

With the continuous development of our country's economy, the people's material and cultural living standards have reached a new high level. The people's concept of demand for buildings (especially public buildings) has also undergone fundamental changes, because the aesthetic performance of buildings has also become higher than ever while the functional and safety requirements have been increasing. In the past 15 years, various types of steel constructions with novel structures and unique shapes have emerged in the country. While constantly pursuing performance and aesthetics, it presents greater challenges and higher requirements for the manufacture and installation of steel structures, and in particular for welding of steel structures.

Due to the increasingly complex nature of the nodes and the differences of on-site construction conditions, various forms of nightside inclined-vertical-butting welding are constantly emerging, but there are no mature cases and construction specifications for reference.

For example, U.S. Pat. No. 4,292,496 by M. G. Hoy et al. discloses a vertical plate welding method using double oblique welds, which is proposed for thick plate welding, and as described herein, well-known methods for improving thick plate welding comprising, for example, use of special welds (such as single-side or double-side U, V, X and Y-shaped bevels), increase of the welding current or reduction of the welding speed, and so on. The method of this patent is directed to arc welding of thick plates (approximately 3.8 cm) such as aluminium and aluminium alloys, selecting the welding current at 290 to 420 A, and proposing the use of a double inclined seam vertical plate welding process under the protection of an inert gas (such as pure argon). However, the essence of the method is to improve the toughness of the weld joint, such as when welding of aluminium alloys, without considering how to ensure the welding speed, in particular, without giving no practical parameters for the welding of steel plates, and without proposing any solutions to eliminate the welding residual stress or solve the problem of sheet deformation.

For another example, Chinese Patent Application No. 94114847.5 relates to a large-scale workpiece, such as a disk-type hydro-generator rotor bracket "on-site" welding method, and although the relevant welding parameters are given in the literature, but the operation manner of the method is essentially based on the consideration of factory conditions, with the aim of special weldments to reduce the welding stress, shrinkage and deformation of the disc surface, without considering the elimination of the welding residual stress or the problem of deformation of the welded plate as well.

In view of this, in order to solve the above problems, it is necessary to provide a new nightside inclined-vertical-butting welding method.

SUMMARY OF THE INVENTION

The purpose of the invention is to provide a method for overcoming the residual stress and deformation control during the construction process of profiled ultra-long oblique vertical welding, providing a nightside inclined-vertical-butting welding method with better inclined weld droplet transition forms, welding sequences and high-altitude welding operation protection.

In order to achieve the above object, the present invention provides a nightside inclined-vertical-butting welding method, the method comprising the following steps of: providing a weldment and a welded plate to which the weldment is to be welded, wherein an end of the weldment to be welded to the welded plate is provided with a first welding face and a second welding face, the first welding face and the second welding face form a pointed cone, a tip position of the pointed cone is defined as an inner side, the space between the first welding face and the welded plate is a first welding area, and the space between the second welding face and the welded plate is a second welding area; in the first welding area, the weldment and the welded plate being welded at the innermost side of the pointed cone to form a first welding pass; in the second welding area, the weldment and the welded plate being welded at the innermost side of the pointed cone to form a second welding pass, and then welding being performed at the outer side of the second welding pass to form a third welding pass adjacent to the second welding pass; in the first welding area, the weldment and the welded plate being welded at the outer side of the first welding pass to form a fourth welding pass, and then welding being performed at a position adjacent to the fourth welding pass to form a fifth welding pass; in the second welding area, the weldment and the welded plate being welded adjacent to the outer side of the third welding pass to form a sixth welding pass.

As an improvement of the present invention, the first weld pass and the second weld pass are welded with welding wire having a diameter of 1.2 mm, welding current of 120 amperes, welding voltage of 18.5 V, and welding speed of 13 cm per minute.

As an improvement of the present invention, the third weld pass and the fourth weld pass are welded with welding wire having a diameter of 1.2 mm, welding current of 135 amperes, welding voltage of 20 V, and welding speed of 9 cm per minute.

As an improvement of the present invention, the fifth weld pass and the sixth weld pass are welded with welding wire having a diameter of 1.2 mm, welding current of 125 amperes, welding voltage of 20.5 V, and welding speed of 6.5 cm per minute.

As an improvement of the present invention, when the outside temperature is below 0 degree, preheating to 30-50 degrees within 75 mm on both sides of a weld joint is required.

As an improvement of the present invention, the method further comprises a heating and dehumidifying step when the air humidity in a weld is greater than 85%.

As an improvement of the present invention, the method further comprises a post-heating treatment in which a width range of 100 mm on both sides of a weld is evenly heated with heating temperature of 200~250° C., and holding time of 1 hour for a plate thickness of every 25 mm, and during heating, heating is evenly performed from low to high from edge to center and from center to edge.

As an improvement of the present invention, the method further comprises a preheating step, and the width of the preheating range is selected to be 150 mm.

As an improvement of the present invention, the method further comprises the following steps of: after the welding is completed, a local heat treatment is performed on the weld to eliminate the stress, wherein the heat treatment adopts a resistance heater, and the covering width is 320 mm around the weld.

As an improvement of the present invention, the weldment is a herringbone arch, and the welded plate is an inverted triangle roof ridge, the herringbone arch comprising two vertically intersecting webs, which are a long web and a short web, respectively, the herringbone arch further comprising an upper chord round tube and a lower chord arc plate.

As an improvement of the present invention, before welding, the lower chord arc plate of the herringbone arch is separated from the webs, the long web and the inverted triangle ridge roof are separately welded, and after the long web is welded to the inverted triangle roof ridge, the lower chord arc plate is then welded to the long web.

As an improvement of the present invention, in the process of welding the lower chord arc plate to the long web, two lower chord arc plates on an opposite surface are welded first, and then two lower chord arc plates on another opposite surface is welded.

As an improvement of the present invention, the lower chord arc plate is arc-shaped and comprises two opposite straight sides and two opposite curved sides, and in the process of welding the lower chord arc plate to the long web, the two curved sides are first welded to the long web, and then the two straight sides are welded to the long web.

As an improvement of the present invention, each side of the lower chord arc plate is divided into a first welding zone and a reserved zone, and when welding, the first welding zone of each side is first welded, and the reserved zones are then welded after the first welding zones on the four sides are welded.

As an improvement of the present invention, when the webs have large deformation, the method further comprises a heating correction step where the heating temperature is controlled to 650±50° C.

As an improvement of the present invention, the method further uses a rack, the rack comprising several channel steel frames for forming the framework of the rack, the channel steel frame being provided with several transverse angle steel frames for forming several brackets to further lay steel springboards, and being further provided with a steel ladder therein.

The method provided by the present invention adopts a welding method for performing three-shot full-swing and segmented welding on each side of the bevel to a thin layer, and strictly controls the thickness and width of a single-pass weld to reduce the heat input for welding. Since the weld of the web is a penetration-butting weld with a tapered splice and a double-side bevel, the weld is equivalent to a surfacing overlay weld with respect to a flange plate (spine side plate), wherein a plastic deformation zone is mainly in the plate thickness direction, and the lateral deformation of the weld metal is not constrained by the base material. Relatively speaking, the effect of residual stress is reduced, and the weld of the web is a penetration-butting weld with a double-side V-shaped bevel to efficiently reduce the deformation of weld angles. At the same time, during installation, the accuracy of docking is strictly ensured, and the weld spacing is controlled to minimize the residual deformation of the weld caused by the increase in the cross-sectional area of the weld.

BRIEF DESCRIPTION OF THE DRAWINGS

FIG. 2 is a schematic flow chart of the nightside inclined-vertical-butting welding method according to the present invention.

FIG. 8 is a table of process parameters during welding the weldment to the welded plate according to the present invention.

DETAILED DESCRIPTION OF THE EMBODIMENTS

Figure 1:
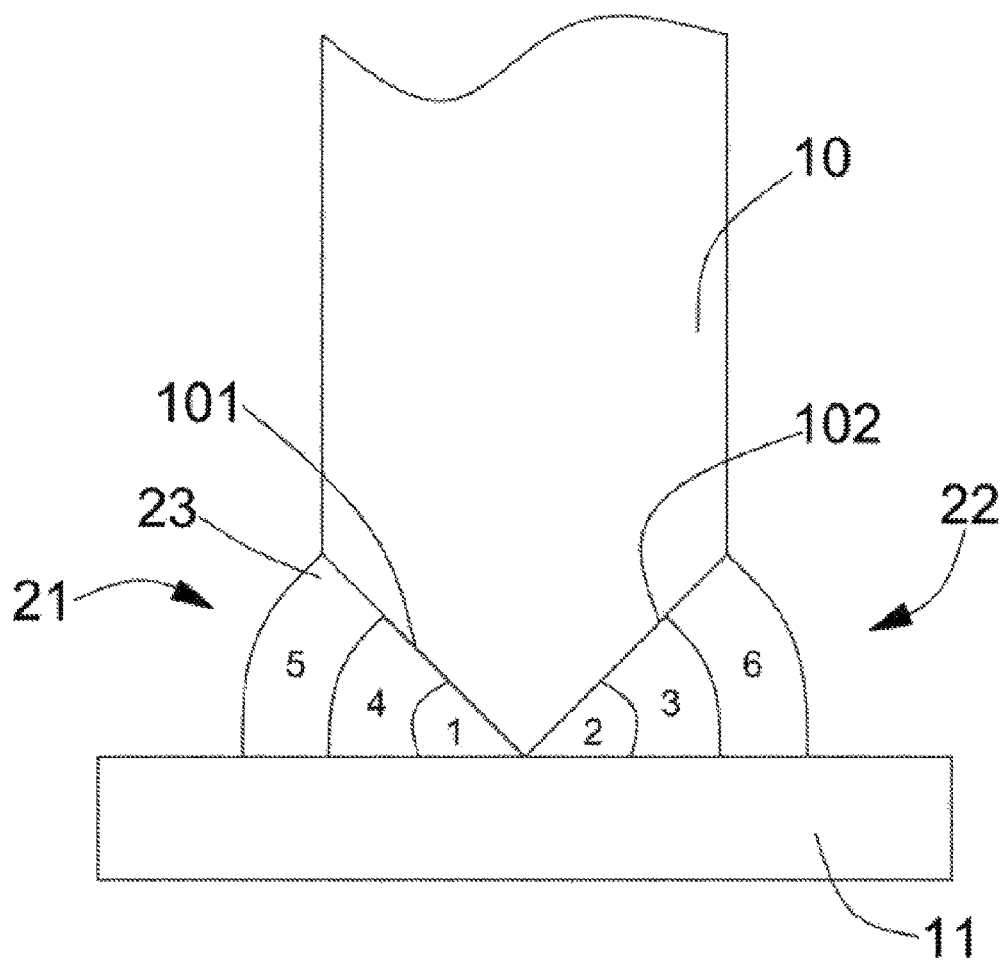
FIG. 1 is a structural schematic view of a nightside inclined-vertical-butting welding method according to the present invention.

In order to further illustrate the technical means and effects of the present invention to achieve the intended purpose, specific embodiments, structures, features and effects of the nightside inclined-vertical-butting welding method proposed in accordance with the present invention will be described in detail below with reference to the accompanying drawings and preferred embodiments.

The foregoing and other technical details, characteristics, and effects of the present invention will be apparent from the following detailed description with reference to the preferred embodiments shown in the drawings. Through the description of the specific embodiments, the technical means and effects adopted by the present invention to achieve the intended purpose can be more deeply and specifically understood, although the drawings are only for reference and for the sake of description, and are not intended to limit the present invention. As the basic content of the welding operation, before the actual construction of the on-site welding of ultra-long nightside inclined-vertical welding, the technical quality department first evaluates the welding procedure according to factors such as the actual form of on-site welding and the on-site welding environment. After completion of personnel and material preparation, it is also necessary to test the base material of a member (mainly detecting the position of the node) before the actual welding, and determine the welding sequence and process according to the actual form of node. While doing welding routines, it is necessary to design a dedicated welding operation platform according to the form of node, and the ultra-long inclined vertical welding of the night side shall be carried out in the welding construction process by means of layering, separation, symmetry, and simultaneous welding, which on the one hand ensures the temperature control in the welding process, and on the other hand, check the installation position of the member in time by using an electronic total station. Similarly, after the completion of the welding operation, it is necessary to perform self-inspection of the project, weld inspection by a professional inspection agency and the like.

Before the welding construction, the on-site construction personnel shall be organized to carefully study the implementation design of the construction organization and the design requirements of construction drawings, clarify the relevant technical problems and know the specifications and technical standards well. Construction safety assurance measures are stipulated and corresponding emergency plans are made. The technical personnel of the construction personnel shall be given a technical disclosure, and the participating construction personnel shall be trained before starting the job, and shall be employed with a certificate holder after passing an examination. This mainly includes the following four parts of:

(1) Familiar with construction drawings, construction plans and related regulatory requirements.

(2) Preparing job instructions, technical disclosures, and ensuring that the technical disclosures are given to individuals.

(3) Understanding operating points and countermeasures for welding operations in special environments; and understanding the welding process requirements for special welding sites.

(4) Before the actual welding, according to the design documents of this project, the construction process and acceptance standards stipulated in the drawings, combining with the structural characteristics of the project, the form of the node, etc. to make the corresponding welding process assessment.

The preparations for the field mainly include the collection of various external equipment and data such as equipment materials involved in the construction operation layer.

Please refer to FIG. 1, which is a structural schematic view of a nightside inclined-vertical-butting welding method according to the present invention. The structure includes a weldment 10 and a welded plate 11 to be welded to the weldment 10, wherein an end of the weldment 10 to be welded to the welded plate 11 is provided with a first welding face 101 and a second welding face 102, the first welding face 101 and the second welding face 102 form a pointed cone, a tip position of the pointed cone is defined as an inner side, the space between the first welding face 101 and the welded plate 11 is a first welding area 21, the space between the second welding face 102 and the welded plate 11 is a second welding area 22, and the solder 23 for welding is contained between the both welding areas.

Please also refer to FIG. 2. In the process of welding the weldment 10 and the welded plate 11, the present invention adopts the flow of sub-area and pass-separation welding as follows:

firstly, positing the relative locations of the weldment 10 and the welded plate 11;

next, performing the first step of welding wherein the weldment 10 and the welded plate 11 are welded in the first welding area 21, and the welding position is the innermost side of the taper, i.e. the position as shown as 1 in FIG. 1 (the first welding pass);

thirdly, performing the second step of welding wherein the weldment 10 and the welded plate 11 are welded in the second welding area 22, and the welding position is the innermost side of the taper, i.e. the position as shown as 2 in FIG. 1 (the second welding pass), followed by welding of the third pass, of which position is the outside of the position of the second welding pass 2 in FIG. 1, and next to the position of the second welding pass 2, i.e. the position of 3 (the third welding pass);

fourthly, performing the third step of welding wherein the weldment 10 and the welded plate 11 are welded in the first welding area 21, and the welding position is the outside of the position of the first welding pass 1 in FIG. 1, i.e. the position of 4 (the fourth welding pass), followed by welding of the fifth pass, of which position is next to the outside of the position of the fourth welding pass 4, i.e. the position of 5 (the fifth welding pass);

fifthly, performing the fourth step of welding wherein the weldment 10 and the welded plate 11 are welded in the second welding area 22, and the welding position is the outside of the position of the third welding pass 3 in FIG. 1, i.e. the position of 6 (the sixth welding pass).

Simply speaking, the welding sequence is to weld one pass of a first side between two elements; next weld two passes of the other side between the two elements; then weld two passes of the first side; and finally weld the last pass of the other side, the total of 6 passes with three passes on each side.

According to the above, the welding passes in the first area 21 includes 1, 4, and 5, and the welding passes in the second area 22 includes 2, 3, and 6, wherein the three welding passes in each area need to be performed in accordance with the process parameters in FIG. 8.

This weld belongs to inclined welding position, for example, with the vertical angle of 20°, which has strong upward welding characteristics. Due to the relatively high welding efficiency of shooting droplets to a spatial position, the weld is difficult to be controlled during welding, and the droplet transition mode of short-circuit transition should be adopted. The short-circuit transition voltage is controlled between 18 to 20V, the short circuit time is longer, the welding process is more stable, and it can be better formed on the inclined position of the night side. A smaller voltage will also effectively reduce the width of the melt and increase the penetration depth.

The welding current and the diameter of the welding wire, i.e. the current density of the welding wire, also have a great influence on the short-circuit transition. In the choice of welding wire, the fine wire has a wide wire feed speed range in the short-circuit transition, and the process is easy to control, so a flux-cored wire having a smaller diameter of φ1.2 mm is selected, and the smaller wire diameter will bring greater current density under the cooling and compression of the $CO_2$ protection gas, and thereby improve welding efficiency.

A welding method for three-shot full-swing and segmented welding on each side of the bevel to a thin layer strictly controls the thickness and width of a single-pass weld, and reduces the heat input for welding to reduce the factors of decreasing the mechanical properties of the weld. The thickness of a single pass weld is controlled at about 6 mm, and the width of the outermost weld pass is controlled within the range of 15 mm. Segments of the weld are controlled to at about 0.6 m and welded from bottom to top.

A heating method using oxygen and acetylene gas neutral flame is used to control the inter-layer temperature of the weld to be 85 to 100° C., a temperature thermometer is used for monitoring during the welding process, and when the welding temperature of the weld is lower than a required temperature, it is immediately heated to the required temperature and then is welded. The weld must be continuously welded and not allowed to stop welding for no reason, in case of special circumstances, immediate measures shall be taken, and after the welding conditions are reached, the welds will be reheated, and the heating temperature is 20 to 30° C. higher than the preheating temperature before welding.

In addition, preferably, some welding conditions may have:
(1) when it is raining, no welding is allowed in the open air, and if it is necessary to carry out the construction, a rainproof treatment must be performed, and rainproof and windproof measures must be provided in the welding work area;
(2) when the outside temperature is lower than 0 degree, it is necessary to preheat to 30-50 degrees within a range of 75 mm on both sides of a weld joint;
(3) if the air humidity in the weld is greater than 85%, heat dehumidification treatment should be taken;
(4) the weld surface needs to be clean, free of rust, and free of paint;
(5) when using manual arc welding (wind force greater than 5 m/s) and carbon dioxide gas shielded welding (wind force greater than 2 m/s), it is forbidden to carry out welding operations without a windproof shed or without windproof measures;
(6) Slag, spatter, and other contaminants should be removed before the actual welding, tack welds and arc-stripping sites must be ground to a gentle slope with an angle grinder, and no defects such as fusion or shrinkage holes must be identified.

During the Process of Welding Construction:

Welding is done by hand-welding the bottom of the root, semi-automatic welding in the middle, and manual welding of the cover. The weldments with liners are all semi-automatically welded with CO2 gas protection.

When one or more stoppages of the same pass of weld are to be renewed, the original welding head must start arcing at a position of at least 15 mm from the original arc extinguishing point, and arcing at the original arc extinguishing point is prohibited. When the arc welding of CO2 gas shielded arc welding is completed, the welding torch can be removed after the protective gas is completely stopped and the weld is completely condensed. It is forbidden to remove the welding torch just after the electrical arc stops burning, so that the red hot melt pool is exposed to the atmosphere and CO2 gas protection is lost.

In the bottom layer, an electrical arc must be ignited at the start point of the weld exceeding 50 mm forwards, and then the electrical arc is used for welding. During arc extinguishing, the electrical arc is not allowed to extinguish at the joint, and instead, the arc should be led to extinguish the arc extinguishing plate at 50 mm beyond the joint, and fill the crater. The arc is transported by a reciprocating arc transfer method. It stays at two sides to avoid the angle between the fillet and the bevel, and achieve a smooth transition.

In the filling layer, before filling and welding, a projection portion on the first layer of the weld and the excess portion caused by arc striking should be removed, and the spatter and dust adhered to the slope wall should be removed to check whether the edge of the bevel is not fused or not. If necessary, it must be removed with an angle grinder. When CO2 gas shielded arc welding, attention should be paid to controlling the flow rate of CO2 gas, and the molten pool is kept in a level state. The transfer and welding method adopts a slanted circle method. When filling the surface of the welding layer, attention should be paid to evenly leaving a depth of 1.5 mm to 2 mm so that the edge of the bevel can be clearly seen when covering.

Welding the surface layer directly relates to whether the appearance quality of the weld meets the quality inspection standards. Before the start of welding, the entire weld should be repaired and the unevenness should be eliminated. If it has not reached the standards, it should be first repaired to maintain the continuous and uniform forming of the weld. The surface of the weld should be welded in the last welding pass and care should be taken to prevent edge defects at the edges.

During the welding process, the inter-layer temperature of the weld should always be controlled between 100 and 150° C. It is required that the welding process should have the greatest continuity. In the welding process, if the repair defect occurs and the welding slag is to be cleaned, the welding must be stopped. As a result, the temperature will decrease, and it must be pre-heated until the temperature reaches a specified value. When a crack occurs in the weld, the welding worker shall not handle it without authorization, report it to a person in charge of the welding technology, find out the causes, and set up the repair measures before handling.

Post-weld heat treatment and protective measures are as follows: the weld having a base material thickness of 25 mm≤T≤80 mm must be post-heated immediately. The post-heat should be uniformly heated in the width range of 100 mm on both sides of the weld. Heating is evenly performed from low to high from edge to center and from center to edge. It is prohibited that the source is concentrated on the local. In the post-heating treatment, the heating temperature is 200 to 250° C., and the post-heating time should be determined by 1 hour per the plate thickness of 25 mm according to the thickness of the work-piece plate. After reaching the post-heating time, it should be slowly cooled to the room temperature.

Post-welding cleaning and inspection: after welding, spatters and welding slag should be removed. After cleaning, a weld gauge and a magnifying glass may be used to inspect the appearance of the weld. There must be no defects such as dents, undercuts, pores, unmelted portions, and cracks. Post-weld self-inspection records may be made. After passing the inspection, check the serial number of the welding worker, which should be printed in the middle of the joint at a distance of 50 mm from the weld in the longitudinal direction of the weld. It is forbidden to print it on the edge of the weld and prevent cracking. The appearance quality inspection standard shall meet the Class I requirements of Table 4-7-13 of GB-50221.

After welding, clean up. After the welding is completed, the lead and extinguishing plates must be removed and polished.

Non-destructive testing is performed on the weld, and non-destructive inspection is performed on the weldment after more than 24 hours have elapsed since it is cooled to the room temperature. The manner of non-destructive inspection is UT testing, of which standard should be consistent with the inspection grades provided in JGB-11345-89 "steel weld manual ultrasonic testing method and quality classification method" Inspection grade and issue an inspection report.

As the web weld is a T-joint double-side bevel penetration butt weld, the weld is equivalent to a surfacing overlay weld with respect to a flange plate (spine side plate), a plastic deformation area is mainly in the direction of the plate thickness, and the lateral deformation of the weld metal is not constrained by its base material. The residual stress's effect is relatively small. The residual stress mainly arises from the joints of the T-joint web and the arc weld to be taken out.

Various studies have shown that if the temperature difference in the welding area is too large or it changes too quickly over time, a large transient stress will be generated and the welding residual stress will be caused. There is a large welding stress in the area of the T-joint weld and in the vicinity, and the welding stress is gradually reduced in the area farther from the weld. Before the start of work, preheating is performed on the internal base material around the weld. The width of the preheat range is selected to be 150 mm to avoid a new temperature difference stress caused by the narrow range. After the welding is completed, a local heat treatment is performed on the weld to eliminate the stress. The heat treatment uses a resistance heater and covers the width of 320 mm around the weld.

Figure 3:
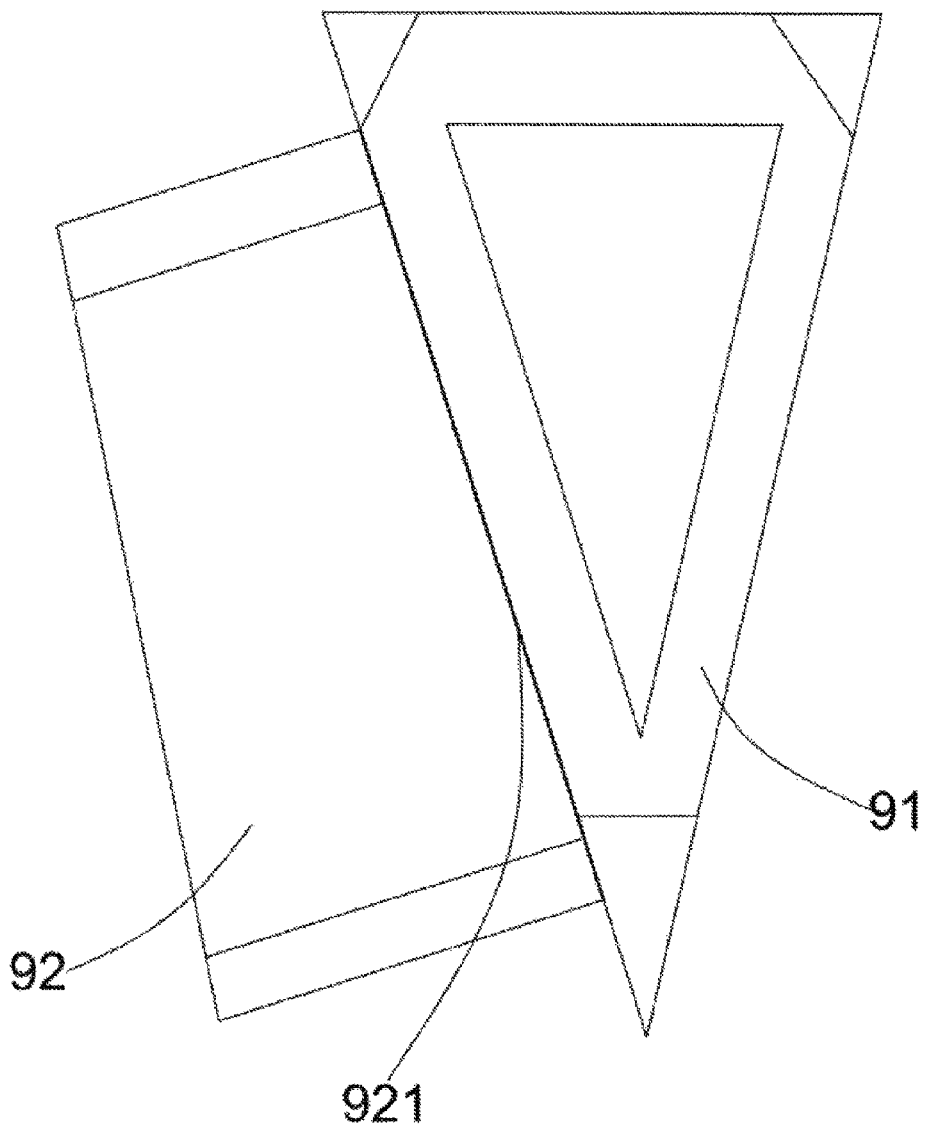
FIG. 3 is a structural schematic view of one specific embodiment of the nightside inclined-vertical-butting welding method according to the present invention.
Figure 4:
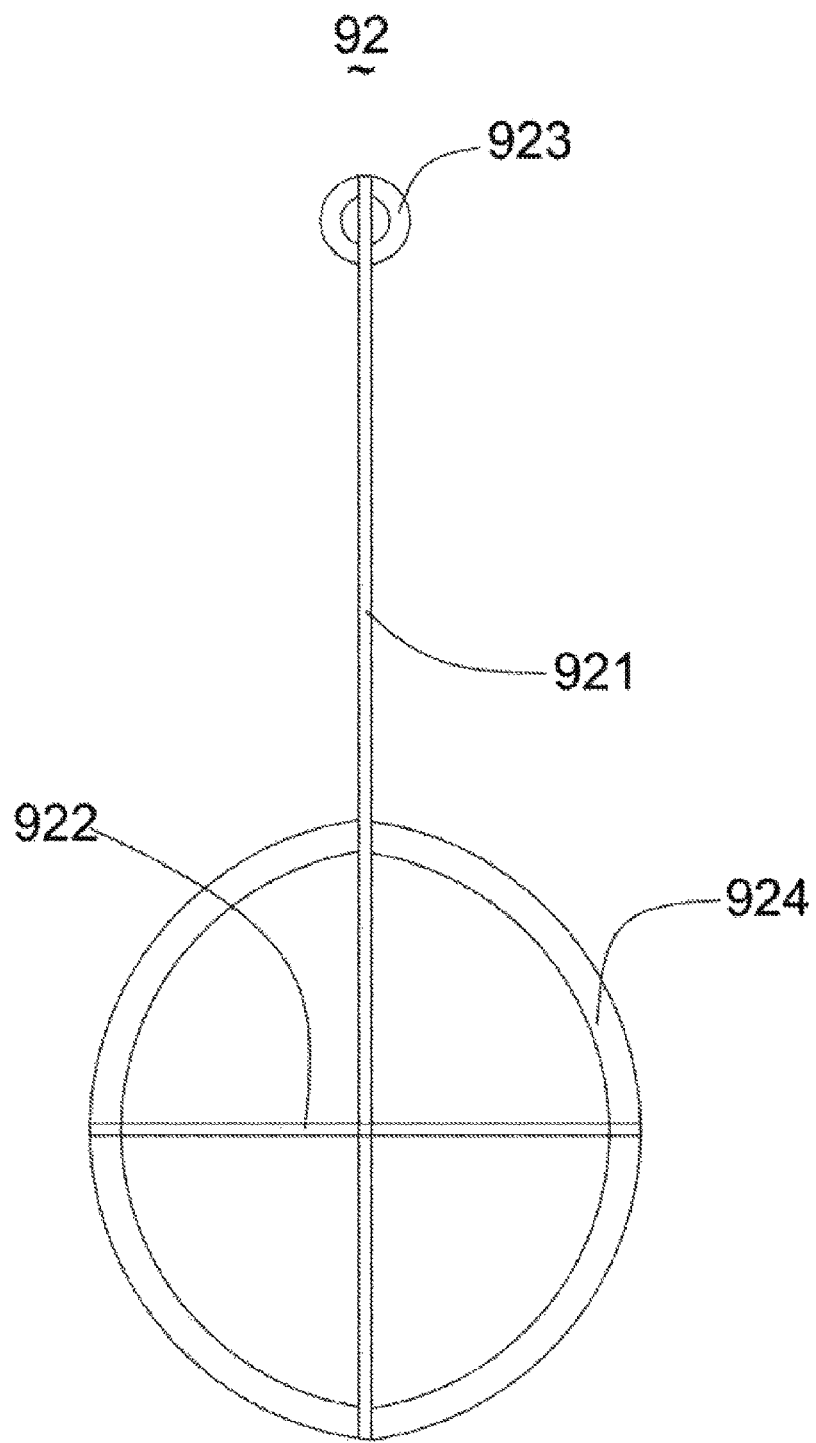
FIG. 4 is a cross-sectional schematic view of a herringbone arch in the specific embodiment of FIG. 3.

Please refer to FIG. 3, which is a structural schematic view of one specific embodiment of the nightside inclined-vertical-butting welding method according to the present invention. In this embodiment, the configuration includes an inverted triangular roof beam 91 and a herringbone arch 92 welded to the triangular roof beam 91. Please also refer to FIG. 4. FIG. 4 shows a schematic cross-sectional view of a herringbone arch 92. As shown in the figure, the herringbone arch 92 includes two vertically intersecting webs, i.e. a long web 921 and a short web 922, which are combined with the web. The upper chord region of the herringbone arch 92 includes an upper chord round tube 923. The lower chord region of the herringbone arch 92 includes a lower chord arc plate 924. In short, the cross-sectional form of the herringbone arch 92 is an olive-shaped cross section in which the upper chord is a round tube structure, and the lower chord is an olive structure composed of four arc plates, the webs penetrating through the upper and lower chords. The length of butt joint between the web of the herringbone arch and the roof beam is 4.87 m, the plate thickness is 30 mm, the material is Q345GJC; the plate thickness of the roof beam side at the butt joint position is 20 mm, and the material is Q345GJC. The web weld (the black line between the herringbone arch 92 and the inverted triangle roof beam 91 in FIG. 3) is at an angle of 20° to the vertical line. In a roof structure, there are a total of 10 pairs (20) of herringbone arches, all of which are located in the vault positions at the height of 30 m to 45 m. Due to the special form of the arch structure, there is no structure that can be used as an operating surface, and the cross-sections of the components are shaped. Therefore, a special safe welding operation platform needs to be designed for the characteristics of the special-shaped members. At the same time, taking into account that the project is located in a coastal area, the operating time spans the winter and spring seasons, the weather is windy, and the operation platform needs to have proper welding protection function to meet the basic requirements of $CO_2$ gas shielded welding operations with high sensitivity to wind speed.

From the above, the web of the herringbone arch 92 corresponds to the weldment, whereas the inverted triangle ridge 91 corresponds to the welding plate, and the web weld is welded by the welding method of the present invention.

In this embodiment, in order to facilitate welding, the lower chord arc plate 924 of the herringbone arch 91 needs to be separated from the web plate, and the long web 921 and the inverted triangle house ridge 91 are separately welded. After the web is welded, the lower chord arc plate 924 is welded to the long web 921, because this embodiment includes four lower chord arc plates, and any two of the four lower chord arc plates are opposed to each other. During welding of the lower chord arc plate 924 to the long web 921, the two lower chord plates on opposite sides (in the diagonal direction) are first welded, and then two lower chord arc plates of the other pair are welded.

The length of the butt weld between the web and roof beam is ultra-long, and the length and thickness are relatively large. Its form is a nightside inclined-vertical weld that is difficult to operate at a high altitude. The deformation and residual stress is difficult to control for the T-joint of a thick plate assembled by thin plates. The weld is located at the position of the key transmission force node of the structure and is extremely sensitive to welding cracks. Controlling cracks of the weld is also very important.

Figure 5:
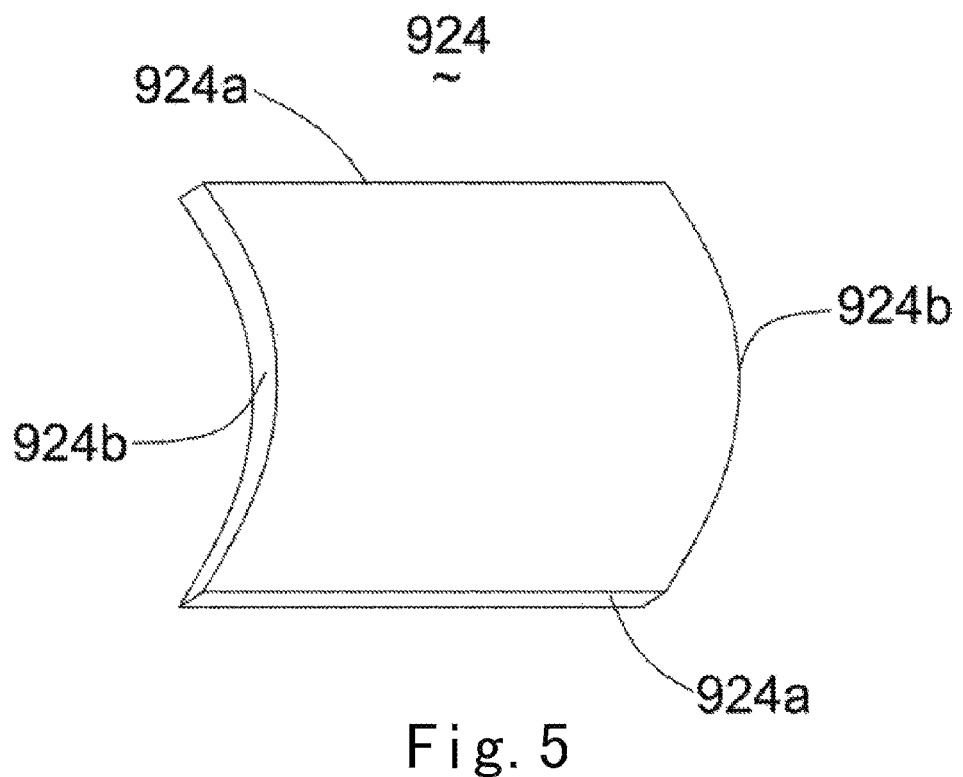
FIG. 5 is a structural schematic view of an arc plate in the specific embodiment of FIG. 3.

Please refer to FIG. 5, which is a schematic diagram of a lower chord arc plate 924. The lower arc chord plate 924 has an arc shape and includes two opposite straight sides 924a and two opposite curved sides 924b. During welding the lower chord arc plate 924 to the long web 921, the two curved sides 924b are first welded to the long web 921, and then the two straight sides 924a are welded to the long web 921.

Figure 6:
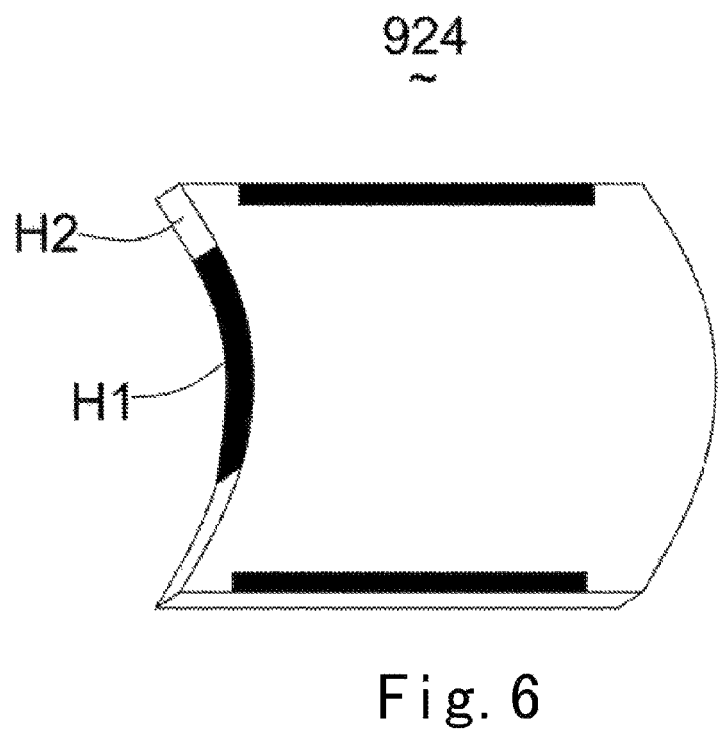
FIG. 6 is a schematic structural view of the arc plate in FIG. 5 at the time of welding.

Please refer to FIG. 6, which is a structural schematic view of the welding of the lower chord arc plate 924. That is, each side of the lower chord arc plate is divided into a first welding zone H1 and a reserved zone H2, and when welding, the first welding zone H1 of each side is first welded, and the reserved zones H2 are then welded after the first welding zones H1 on the four sides are welded.

The degree of binding of the welds causes the release of transient stress during cooling, which is a major factor in the generation of residual stress. After the welding of the cross webs (i.e., the combination of long and short webs) is completed, the subsequent welding of the lower chord arc plate is greatly restrained. Two arc plates at the diagonal position are first welded on the welding sequence, and the degree of restraint is small. The other two diagonal arc plates are reserved by 350 mm at the change angle position and then are welded during welding. After other positions are welded, welding is performed on the reserved positions so that the welding stress can be dissipated more smoothly.

The web weld is a double-faced V-shaped butt fusion butt weld that can effectively reduce weld angle distortion. At the same time, during installation, the accuracy of docking is strictly ensured, and the weld spacing is controlled to minimize the residual deformation of the weld caused by the increase in the cross-sectional area of the weld.

The deformation of the weld is unavoidable and can only be minimized. For example, due to accidental factors such as improper operation during welding, a large deformation of the web occurs. The method of hammering and heating is used for the treatment. The heating temperature is controlled to be at 650±50° C. The number of times of heating at the same place must not exceed twice to avoid embitterment of the material.

Analyze the deformations of the weld that are more likely to occur. One is a local unilateral horn deformation, which is caused by the differences in the welding process and personnel levels at both sides of the welding process. During the calibration, Ribbon heating is performed on the outer side of the bending weld and around the outer side. Micro-oxidation flame is used when heating.

Another is a wavy deformation of the web, which is caused by the longitudinal shrinkage of the weld. During the calibration, a hammering method is used to hammer the strip range within 3 cm from the weld to make the shortened metal elongated.

Figure 7:
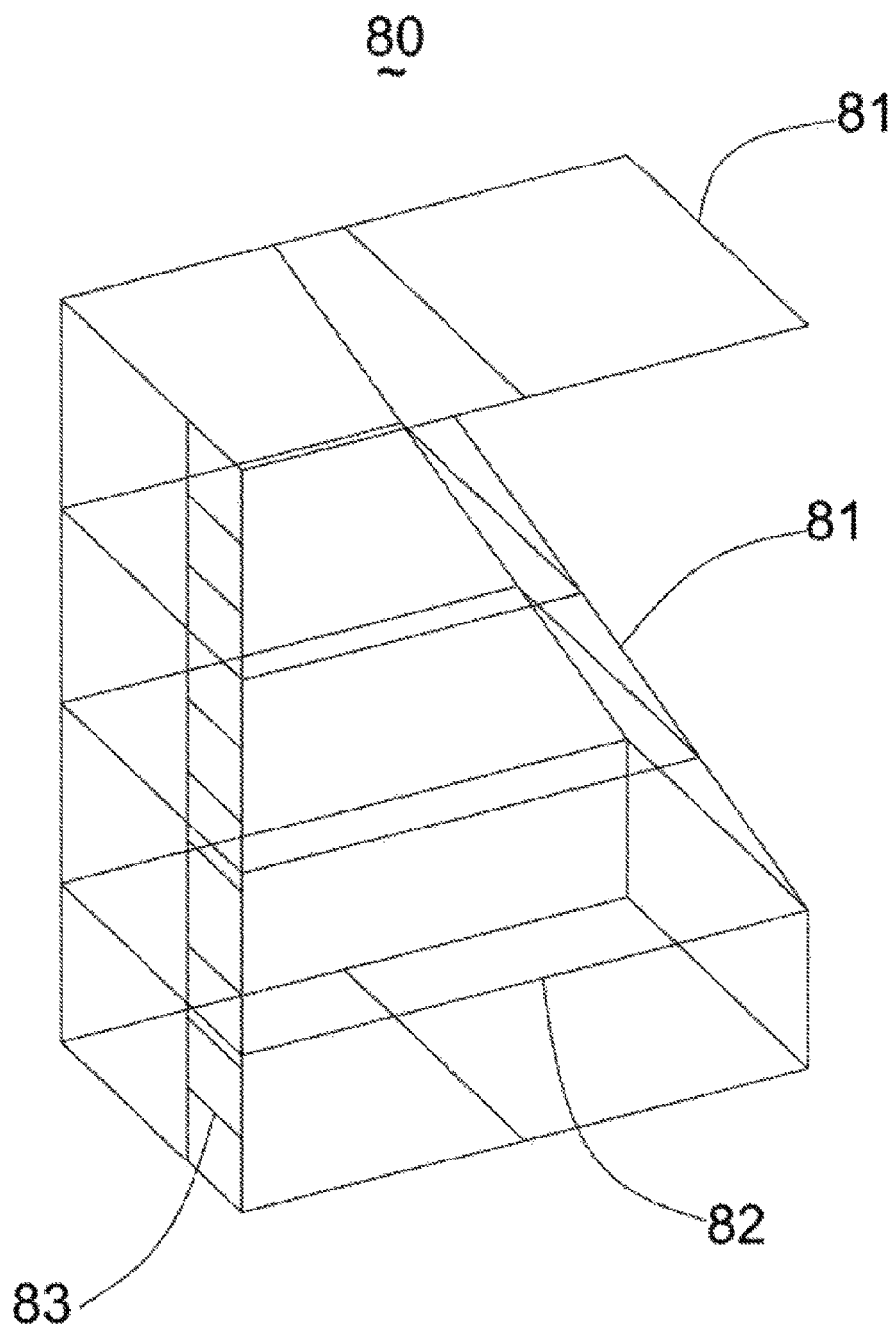
FIG. 7 is a schematic perspective view of a rack used in the nightside inclined-vertical-butting welding method according to the present invention.

Please refer to FIG. 7, which is a rack 80 used in the present invention. In order to solve the space problem of welding operation, a special operation protection rack is designed according to structural features. The rack 80 includes several channel steel frames 81 for forming the framework of the rack 80. Several transverse angle frames 82 are provided on the channel steel frame 80 for forming several brackets to further lay a steel springboard (not shown). In addition, a steel ladder 83 is also provided in the channel steel frame 81 for the construction personnel to pass up and down. The overall form of the rack is the same as the vertical sloping angle of the inverted triangle roof beam, which fits the roof beam side plate and the upper part is welded and fixed by the card plate and the roof beam, which is safe and reliable. Its four horizontal angle steel frames can be used to handle the various heights of welding within the rack after laying the springboard. During work, a windproof cloth around the frame effectively prevents the impact of high altitude and windy environment on the impact of $CO_2$ gas shielded welding.

A rack can be hung directly on the roof beam weld. A vertical steel ladder is set inside the rack to facilitate the workers to walk up and down; the rack is closely attached to the roof beam, and a steel springboard is laid on each floor, and safety nets and windproof cloths are installed around the rack to ensure the safety of construction personnel in the rack.

The welding method provided by the present invention is described in detail from the construction process, and is combined with a specific embodiment. The method is systematically elaborated from various aspects such as economic timeliness, cost savings, technical experience, quality control, and the like. It is a scientific example of the same type of engineering. The on-site welding method of ultra-long nightside vertical welding controls the difficulty in controlling the quality of welding that is difficult to be solved in the past. This eliminates the cost of weld repairs and other related costs. On the other hand, a safe and reliable operation rack is used in the welding process to the cost of materials.

The weld structure in the specific embodiment is a space arched pre-stressed structural system, which has a unique form, a novel design, and a complex form of components. The steel structure of the roof is composed of a 10 inch arch structure and a space stress system. During the construction of profiled ultra-long inclined-vertical welding, it overcomes several difficulties in the residual stress and deformation control, the transition pattern of the droplet welds in the oblique weld, the welding sequence, and the protection of the high-altitude welding operation. This is accomplished with good quality. Welding of unconventional welds can provide lessons for similar projects. Among them, the pass rate of one-time inspection of the nightside ultra-long inclined-vertical welding weld is 100%, and the pass rate of one-time inspection of the third-party test is 100%, which has achieved good economic and social impact.

The above description is merely an embodiment of the present invention and does not limit the present invention in any form. Although the present invention has been disclosed with the above embodiments, it is not intended to limit the present invention. Any technical person skilled in the art can make some changes or modifications for the technical content disclosed above as equivalent embodiments without departing from the scope of the technical solution of the present invention. However, any simple changes, equivalent variations and modifications made to the above embodiments according to the technical essence of the present invention, without departing from the technical solution content of the present invention, fall within the scope of the technical solution of the present invention.

What is claimed is:

1. A nightside inclined-vertical-butting welding method, characterized in that the method comprises the following steps of:

providing a weldment and a welded plate to which the weldment is to be welded, wherein an end of the weldment to be welded to the welded plate is provided with a first welding face and a second welding face, the first welding face and the second welding face form a pointed cone, a tip position of the pointed cone is defined as an inner side, the space between the first welding face and the welded plate is a first welding area, and the space between the second welding face and the welded plate is a second welding area;

in the first welding area, the weldment and the welded plate being welded at the innermost side of the pointed cone to form a first welding pass;

in the second welding area, the weldment and the welded plate being welded at the innermost side of the pointed cone to form a second welding pass, and then welding being performed at the outer side of the second welding pass to form a third welding pass adjacent to the second welding pass;

in the first welding area, the weldment and the welded plate being welded at the outer side of the first welding pass to form a fourth welding pass, and then welding being performed at a position adjacent to the fourth welding pass to form a fifth welding pass;

in the second welding area, the weldment and the welded plate being welded adjacent to the outer side of the third welding pass to form a sixth welding pass, wherein the method further comprises a preheating step, and the width of the preheating range is selected to be 150 mm, wherein the preheating step comprises preheating to 30-50 degrees within 75 mm on both sides of a weld joint when the outside temperature is below 0 degree.

2. The nightside inclined-vertical-butting welding method as claimed in claim 1, characterized in that the first weld pass and the second weld pass are welded with welding wire having a diameter of 1.2 mm, welding current of 120 amperes, welding voltage of 18.5 V, and welding speed of 13 cm per minute.

3. The nightside inclined-vertical-butting welding method as claimed in claim 2, characterized in that the third weld pass and the fourth weld pass are welded with welding wire having a diameter of 1.2 mm, welding current of 135 amperes, welding voltage of 20 V, and welding speed of 9 cm per minute.

4. The nightside inclined-vertical-butting welding method as claimed in claim 3, characterized in that the fifth weld pass and the sixth weld pass are welded with welding wire having a diameter of 1.2 mm, welding current of 125 amperes, welding voltage of 20.5 V, and welding speed of 6.5 cm per minute.

5. The nightside inclined-vertical-butting welding method as claimed in claim 1, characterized in that the method further comprises a post-heating treatment in which a width range of 100 mm on both sides of a weld is evenly heated with heating temperature of 200 to 250° C., and holding time of 1 hour for a plate thickness of every 25 mm, and during heating, heating is evenly performed from low to high from edge to center and from center to edge.

6. The nightside inclined-vertical-butting welding method as claimed in claim 1, characterized in that the method further comprises the following steps of: after the welding is completed, a local heat treatment is performed on the weld to eliminate the stress, wherein the heat treatment adopts a resistance heater, and the covering width is 320 mm around the weld.

7. The nightside inclined-vertical-butting welding method as claimed in claim 1, characterized in that the weldment is a herringbone arch, and the welded plate is an inverted triangle roof ridge, the herringbone arch comprising two vertically intersecting webs, which are a long web and a short web, respectively, the herringbone arch further comprising an upper chord round tube and a lower chord arc plate.

8. The nightside inclined-vertical-butting welding method as claimed in claim 7, characterized in that before welding, the lower chord arc plate of the herringbone arch is separated from the webs, the long web and the inverted triangle ridge roof are separately welded, and after the long web is welded to the inverted triangle roof ridge, the lower chord arc plate is then welded to the long web.

9. The nightside inclined-vertical-butting welding method as claimed in claim 8, characterized in that in the process of welding the lower chord arc plate to the long web, two lower chord arc plates on an opposite surface are welded first, and then two lower chord arc plates on another opposite surface is welded.

10. The nightside inclined-vertical-butting welding method as claimed in claim 7, characterized in that the lower chord arc plate is arc-shaped and comprises two opposite straight sides and two opposite curved sides, and in the process of welding the lower chord arc plate to the long web, the two curved sides are first welded to the long web, and then the two straight sides are welded to the long web.

11. The nightside inclined-vertical-butting welding method as claimed in claim 10, characterized in that each side of the lower chord arc plate is divided into a first welding zone and a reserved zone, and when welding, the first welding zone of each side is first welded, and the reserved zones are then welded after the first welding zones on the four sides are welded.

12. The nightside inclined-vertical-butting welding method as claimed in claim 7, characterized in that the method further comprises a heating correction step, when the webs have large deformation, wherein the heating correction step comprises performing Ribbon heating on an outer side of a bending weld and around the outer side, and the heating temperature is controlled to 650±50° C.

13. The nightside inclined-vertical-butting welding method as claimed in claim 1, characterized in that the method further uses a rack, the rack comprising several channel steel frames for forming the framework of the rack, the channel steel frame being provided with several transverse angle steel frames for forming several brackets to further lay steel springboards, and being further provided with a steel ladder therein.

\* \* \* \* \*